United States Patent
Block et al.

(10) Patent No.: US 7,299,179 B2
(45) Date of Patent: Nov. 20, 2007

(54) THREE-STAGE INDIVIDUAL WORD RECOGNITION

(75) Inventors: Hans-Ulrich Block, München (DE); Stefanie Schachtl, Alling (DE)

(73) Assignee: Siemens Aktiengesellschaft, Munich (DE)

( * ) Notice: Subject to any disclaimer, the term of this patent is extended or adjusted under 35 U.S.C. 154(b) by 177 days.

(21) Appl. No.: 10/545,041

(22) PCT Filed: Jan. 19, 2004

(86) PCT No.: PCT/EP2004/000351

§ 371 (c)(1),
(2), (4) Date: Aug. 11, 2005

(87) PCT Pub. No.: WO2004/072954

PCT Pub. Date: Aug. 26, 2004

(65) Prior Publication Data

US 2006/0074662 A1   Apr. 6, 2006

(30) Foreign Application Priority Data

Feb. 13, 2003   (DE) ................ 103 06 022

(51) Int. Cl.
*G10L 15/02* (2006.01)
(52) U.S. Cl. .................................... 704/254
(58) Field of Classification Search ...................... None
See application file for complete search history.

(56) References Cited

U.S. PATENT DOCUMENTS

| | | | | |
|---|---|---|---|---|
| 4,241,329 A | * | 12/1980 | Bahler et al. | 704/231 |
| 4,343,969 A | * | 8/1982 | Kellett | 704/254 |
| 5,058,166 A | * | 10/1991 | Ney et al. | 704/254 |
| 5,122,951 A | * | 6/1992 | Kamiya | 704/9 |
| 5,625,748 A | * | 4/1997 | McDonough et al. | 704/251 |
| 5,638,425 A | | 6/1997 | Meador, III et al. | |
| 5,724,593 A | | 3/1998 | Hargrave, III et al. | |
| 5,873,056 A | | 2/1999 | Liddy et al. | |
| 5,987,414 A | * | 11/1999 | Sabourin et al. | 704/270 |
| 6,009,392 A | * | 12/1999 | Kanevsky et al. | 704/245 |
| 6,256,630 B1 | | 7/2001 | Gilai et al. | |
| 2002/0111801 A1 | | 8/2002 | Wu et al. | |
| 2002/0165715 A1 | | 11/2002 | Riis et al. | |
| 2003/0004722 A1 | | 1/2003 | Butzberger et al. | |
| 2004/0034527 A1 | | 2/2004 | Henecke et al. | |

FOREIGN PATENT DOCUMENTS

| | | |
|---|---|---|
| DE | 199 27 317 A1 | 12/2000 |
| DE | 102 07 895 A1 | 9/2003 |
| EP | 1 162 602 A1 | 12/2001 |

OTHER PUBLICATIONS

A. Bröder, "D6 Sprache", Uni Bonn, Verbesserte und erweiterte Auflage, Folien zur Übung im SS 2004, Psychologisches Institut der Universität Bonn, Harman Becker Automotive Systems GmbH, 2004, pp. 1-14.

* cited by examiner

Primary Examiner—David D. Knepper

(57) ABSTRACT

In a three-stage speech recognition process, a phoneme sequence is first assigned to a speech unit, then those vocabulary entries which are most similar to the phoneme sequence are sought in a selection vocabulary, and finally the speech unit is recognized using a speech unit recognizer which uses, as its vocabulary, the selected vocabulary entries which are most like the phoneme sequence.

19 Claims, 2 Drawing Sheets

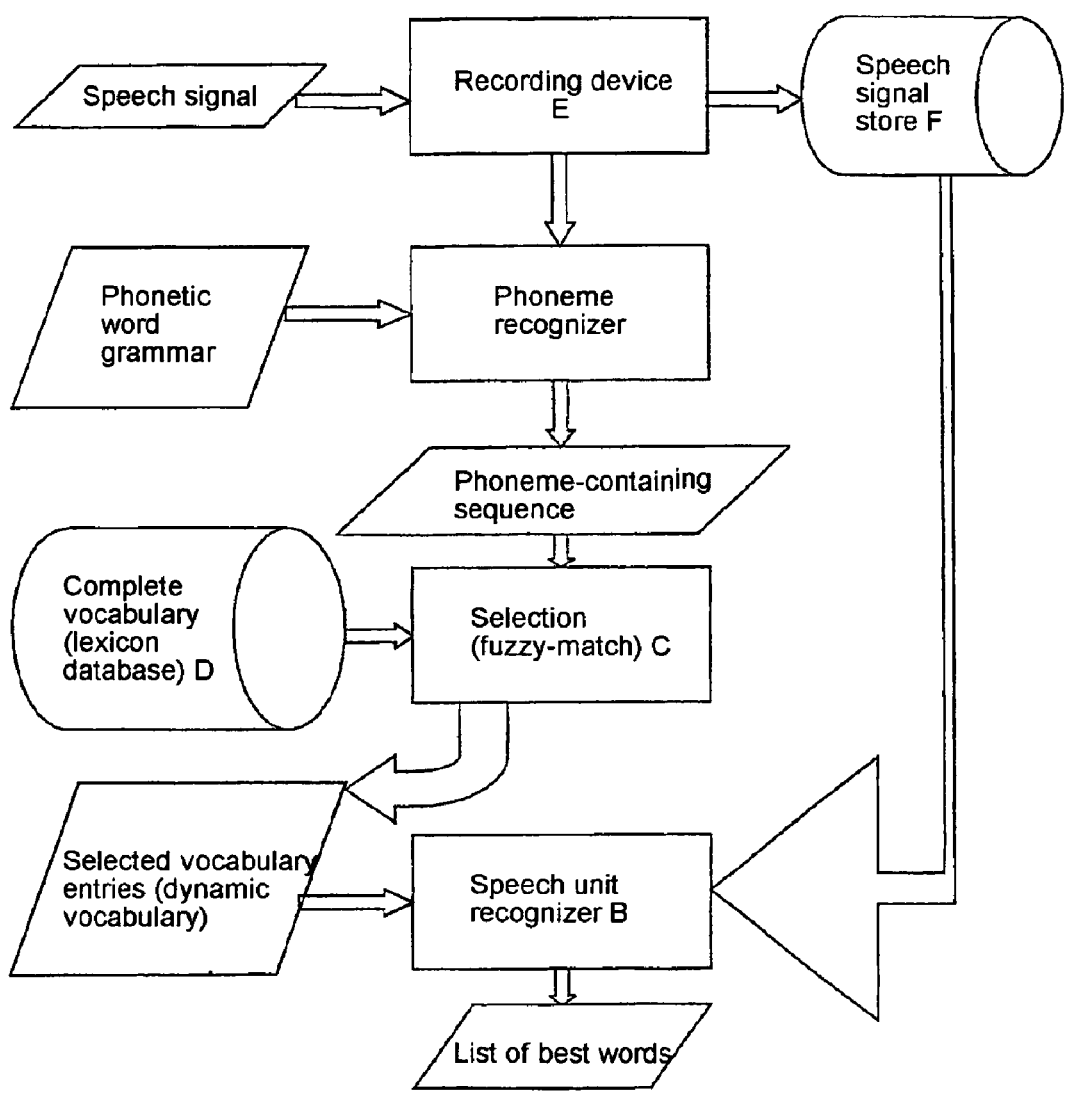

FIG 2
```
word(W) --> syllable(t(W,B)),syllable(t(B,[])).
word(W) --> syllable(t(W,[])).

syllables(t(A,B)) --> syllable_2(t(A,C)),syllables(t(C,B)).
syllables(t(A,B)) --> syllable_2(t(A,B)).

syllable(t(A,B)) --> initialsound(t(A,C)), syllable_2(t(C,B)).
syllable(t(A,B)) --> syllable_2(t(A,B)).

syllable_2(t(A,B)) --> (vowel_1(t(A,D)),
                       (finalsound_1(t(D,B))
                       ;finalsound_2(t(D,B))
                       )
                       ;vowel_2(t(A,D)), finalsound_2(t(D,B))
                       ).
syllable_2(t(A,B)) --> vowel(t(A,B)), vowel(T) --> vowel_1(T).
vowel(T) --> vowel_2(T).

vowel_1(t([a|A],A)) --> [a].
vowel_1(t([ae|A],A)) --> [ae].
...
vowel_1(t([uh|A],A)) --> [uh].

vowel_2(t([ai|A],A)) --> [ai].
...
vowel_2(t([au|A],A)) --> [au].

initialsound(t[b|A],A)) --> [b].
initialsound(t[d|A],A)) --> [d].
...
initialsound(t[z|A],A)) --> [z].

initialsound(t[b,l|A],A)) --> [bl].
initialsound(t[b,r|A],A)) --> [br].
...
initialsound(t[t,s|A],A)) --> [ts].

initialsound(t[sh,p,l|A],A)) --> [shpl].
initialsound(t[sh,p,r|A],A)) --> [shpr].
initialsound(t[sh,t,r|A],A)) --> [shtr].

finalsound_1(t[l,t,s|A],A)) --> [lts].
...
finalsound_1(t[x|A],A)) --> [x].
...
finalsound_2(t[r,l,t|A],A)) --> [rlt].
finalsound_2(t[r,m,t|A],A)) --> [rmt].
...
finalsound_2(t[r,n|A],A)) --> [rn].
finalsound_2(t[r,t,s|A],A)) --> [rts].
finalsound_2(t[ng|A],A)) --> [ng].
```

THREE-STAGE INDIVIDUAL WORD RECOGNITION

CROSS REFERENCE TO RELATED APPLICATIONS

This application is the US National Stage of International Application No. PCT/EP2004/000351, filed Jan. 19, 2004 and claims the benefit thereof. The International Application claims the benefits of German application No. 10306022.7, filed Feb. 13, 2003, both applications are incorporated by reference herein in their entirety.

FIELD OF INVENTION

The invention relates to a three-stage individual word recognition.

SUMMARY OF THE INVENTION

Speech recognition for individual words from a large vocabulary is to be made possible on so-called embedded hardware, such as for example a mobile telephone, a cordless telephone a PDA, a notepad or a navigation system, which are currently notable for restrictions on their main memory and low computing power. In this context, the term 'a large vocabulary' means vocabularies of more than 60,000 words. The object is, for example, to enable the names of towns to be input into a navigation system by voice command, or a dictation option to be offered for an SMS.

Over and above this, it is to make possible speech recognition of individual words from a very large vocabulary on commonly available PC hardware. In this context, the term 'a very large vocabulary' means vocabularies of more than 200,000 words. The object of this is, for example, to enable a search for entries in a public telephone directory or address list by means of a voice command.

The methods used until now require too much computing power or too much memory space for embedded hardware. For commonly available PC hardware there are at least methods available for a large vocabulary. For this purpose, speech recognizers with a so-called "tree search" or so-called "FST search" are used.

An interesting technical solution method is described in U.S. Pat. No. 6,256,630 B1. This proposes a system which works with a similarity measure.

U.S. Pat. No. 5,873,056 also described a method for speech recognition.

U.S. Pat. No. 5,638,425 discloses a speech recognition procedure with a very large vocabulary on PC hardware, in which use is made of a word recognizer and a phoneme recognizer, and the result of the recognition which is used as the search word in the database is that with the best measure of agreement.

Starting from this position, the object underlying the invention is to make possible speech recognition, in particular, individual word recognition, when there is a large or very large vocabulary, with little memory and computing power.

This object is achieved by the inventions specified in the independent claims. Advantageous embodiments are derived from the dependent claims.

In a method for speech recognition, a phoneme-containing sequence is assigned to a speech unit, in particular a word, by a phoneme recognizer, that is a facility for recognizing phonemes. This is effected in that the phoneme recognizer recognizes phonemes which are present in the speech unit. The phoneme-containing sequence thus generated is then compared with the vocabulary entries in a selection vocabulary which is large or very large, and-correspondingly has very many vocabulary entries. From these very many vocabulary entries, are selected a number of vocabulary entries which are similar to the phoneme-containing sequence. Preferably, these will be the vocabulary entries most similar to phoneme-containing sequence, and their number will be substantially less than the number of vocabulary entries in the selection vocabulary. The vocabulary entries thus selected, which are similar to the phoneme-containing sequence, are then loaded as the recognition vocabulary for a speech unit recognizer, that is a facility for recognizing speech units, and the speech unit is recognized from this recognition vocabulary by the speech unit recognizer. For the purpose of selecting the vocabulary entries similar to the phoneme-containing sequence, the phoneme-containing sequence of the word which is to be recognized is split up into phoneme units. For all the vocabulary entries in the entire vocabulary, the frequency of occurrence of the individual phoneme units in the vocabulary entries concerned is then determined. A set is formed which is the union of all the vocabulary entries which have at least one phoneme unit in common with the word which is to be recognized, together with a corresponding frequency measure of how often the phoneme units of the word which is to be recognized occur in the vocabulary entry concerned. The frequency measure is normalized against the length of the speech unit and against the length of the vocabulary entry concerned. On the basis of this normalized frequency measure a partial vocabulary is selected, from the union set, using which the word to be recognized will finally be recognized.

This gives the advantage that, both in the recognition by the phoneme recognizer and in the recognition by the speech unit recognizer, the search can be conducted within a relatively small vocabulary, which implies a substantial saving of memory and computing resources. In the selection vocabulary, on the other hand, only a similarity search is conducted, which is significantly less computationally intensive.

The usual phoneme recognizers unfortunately often provide a relatively poor recognition performance. For this reason, it is logical to improve the recognition performance of the phoneme recognizer used in the first stage by certain measures.

For this purpose, it is possible to use as the recognition vocabulary of the phoneme recognizer not only, for example, the 36 phonemes in the German language, but in addition other units, which are inserted into the vocabulary of the phoneme recognizer as pseudo-phonemes. Because larger units are generally better recognized, it is possible to use as pseudo-phonemes larger units which do not in themselves yet form words, in particular consonant clusters, combinations of a vowel and a consonant and/or the most commonly occurring syllables in the language of the speech unit which is to be recognized. The phoneme recognizer is thus a recognizer which recognizes, in particular but not only, phonemes.

However, the number of vocabulary entries for the phoneme recognizer should not become so large that the resources of the embedded or PC speech recognizer are too heavily loaded, which would result in the advantages of the invention being lost. In practice, it has been found advantageous if the number of vocabulary entries for the phoneme recognizer amounts to about 0.01% to 10% of the vocabulary entries of the selection vocabulary, in particular about 0.1% to 1%. Depending on the embedded solution, the number of vocabulary entries for the phoneme recognizer should thus amount to about 300 or even about 2000.

In the case of a relatively large number of vocabulary entries for the phoneme recognizer, that is about 2000, it is possible to take into account, as pseudo-phonemes, not only combinations of one vowel and one consonant, but also combinations of several vowels and consonants.

Another possibility for improving the performance of the phoneme recognizer consists in only permitting certain orders of occurrence for phonemes, or phonemes and larger units in the sequence of phonemes. That is, in particular, the orders of occurrence which are phonotactically correct. This can be achieved in the recognition process by the use of a speech model and/or by a speech unit grammar which specifies the speech unit formation rules of the language concerned.

Again at the second stage, the selection from the selection vocabulary of vocabulary entries similar to the phoneme-containing sequence, it is possible to achieve substantial increases in efficiency by particular measures.

Because the speech units which are to be recognized are generally individual words, any larger unit which is incorrectly recognized, in particular an incorrectly recognized syllable, will lead to a relatively large error in determining the similarity, and hence in making the selection, because it in itself makes up a large fraction of the word. Often however, an incorrectly recognized larger unit does at least contain one or more correctly recognized phonemes. This can be exploited by splitting up the larger units into phonemes again before making the selection of vocabulary entries similar to the phoneme-containing sequence, so that the phoneme-containing sequence contains as the phoneme sequence exclusively, or almost exclusively, phonemes. By doing so, the correct phonemes contained in the incorrectly recognized larger unit make a correct contribution to the determination of the similarity.

In making the selection of vocabulary entries similar to the phoneme-containing sequence, it is possible in principle to use any arbitrary similarity measure to determine the similarity between the phoneme-containing sequence and each of the vocabulary entries to which it is to be compared. The vocabulary entries in the selection vocabulary are then arranged according to the magnitude of their similarity measure, and the vocabulary entries most similar to the phoneme-containing sequence are selected.

However, with a large or very large selection vocabulary, a determination of the similarity measure for all the vocabulary entries would involve an unjustifiable time. For this reason, it is advantageous if the selection of vocabulary entries similar to the phoneme-containing sequence is made with the help of fuzzy matching and/or an index search. For this purpose, the phoneme-containing sequence can be split up into the set of its phoneme bigrams.

The requirements applying to the size of the recognition vocabulary for the speech unit recognizer are roughly the same as those for the size of the phoneme recognizer's recognition vocabulary. Accordingly, the vocabulary of the speech unit recognizer and the vocabulary of the phoneme recognizer are of roughly the same size. Because the selected vocabulary entries which are similar to the phoneme-containing sequence are used as the recognition vocabulary for the speech unit recognizer, or at least form a significant part of it, this means that the number of vocabulary entries selected as being similar to the phoneme-containing sequence amounts to about 0.01% to 10% of the vocabulary entries in the selection vocabulary, in particular about 0.1% to 1%. With present day solutions, this gives a number of about 300, or even a number of about 2000.

For speech recognition which is independent of the speaker, the speech unit recognizer used can preferably be an HMM recognizer. Alternatively, or additionally, it is however also possible to use a DTW recognizer. The speech unit recognizer uses, in particular, a Viterbi search.

In most application situations the speech unit will be a word, in particular a name in a form such as a town name, street name and/or personal name. Accordingly, the speech unit recognizer is then generally a word recognizer.

A device which is equipped and has the facilities for executing the above method can be realized, for example, by the appropriate set-up and programming of a data processing system. In particular this enables the phoneme recognizer, the selection facilities and speech unit recognizer to be made available. Because the speech unit is required both for the recognition operation of the phoneme recognizer and also for the recognition operation of the speech unit recognizer, the device will preferably contain facilities by which the speech unit can be fed to both the phoneme recognizer and also later to the speech unit recognizer. These facilities could, for example, have a speech signal memory.

Other advantageous embodiments of the device arise by analogy with the advantageous embodiments of the method.

A program product for a data processing system, containing sections of code with which one of the methods outlined can be executed on the data processing system, can be produced by a suitable implementation of the method in a programming language and conversion into code which can be executed by the data processing system. For this purpose, the sections of code are stored. Here, the term program product means the program as a saleable product. This can be provided in any arbitrary form, for example on paper, a computer-readable data medium or distributed over a network.

Further significant advantages and features of the invention are apparent from the description of an exemplary embodiment, by reference to the drawing.

BRIEF DESCRIPTION OF THE DRAWINGS

FIG. 1 shows a flow chart of a method for speech recognition, and

FIG. 2 shows a word grammar.

DETAILED DESCRIPTION OF INVENTION

A device for speech recognition in the form of a speech recognition system for large vocabularies contains, for example, the following components:

a first speech recognition system in the form of a phoneme recognizer A which, on the target platform, can recognize units from a defined vocabulary of at least 300 words, which are spoken continuously, which is a very limited requirement, and which permits the specification of a speech model in the form of a Mealy automaton;

a second speech recognition system in the form of a speech unit recognizer B which, on the target platform, can recognize individual words from a dynamically-loadable vocabulary of at least 300 words, which is also a very limited requirement;

facilities for selecting, from a selection vocabulary, vocabulary entries similar to the phoneme-containing sequence, in the form of a fuzzy-match index system C, such as is familiar from the technology of translation memories, and the use of which is described, for example in U.S. Pat. No. 5,724,593;

a database D, in which is stored the vocabulary to be recognized as the selection vocabulary, in its graphemic and phonetic forms;

a recording device E, with which the speech signal uttered by the user is recorded;

a speech signal memory F, in which the speech signal recorded by the recording device E is stored;

optionally, a speech unit grammar in the form of a grammar G which specifies the phonetic rules of the language.

In the first stage of a method for speech recognition, phoneme recognition is carried out. For this purpose, an utterance from a user is recorded by the recording device E and is stored in the speech signal memory F. Using the first speech recognition system in the form of a phoneme recognizer A, a phoneme-containing sequence is assigned to the speech signal.

In doing this, the choice of the recognition vocabulary for the phoneme recognizer is particularly important. Methods used until now for phoneme recognition define the units to be used by the phoneme recognizer as the phonemes of the language, for German that is for example a, a:, ä, ä:, e, . . . , which are recognized without a speech model. Systems constructed in this way are very susceptible to interference, and in general supply very poor recognition results, which can only be used with strong qualifications. In particular, the phoneme sequences which are recognized when the same word is input vary greatly from one speaker to another.

The recognition of larger groupings, such as for example words, functions better because the sound quality of consonants also reflects on the adjacent sounds.

For this reason, the phoneme recognizer is preferably structured in such a way that the largest possible units are recognized as phonemes, but on the other hand the vocabulary is kept so small that the phoneme recognizer can be executed on embedded hardware. Because the size of the recognition vocabulary of a speech recognition system determines the memory and CPU requirements.

For this reason, the units chosen for the recognition vocabulary of the phoneme recognizer are: the phonemes (sounds) of the language (as in conventional phoneme recognizers, in German 36)+all the consonant clusters which occur in the vocabulary (in German, for example, lchst, mpft etc., in total about 180)+the 120 most frequent syllables. This gives a total of about 300 vocabulary entries, which corresponds to the normal capacity of embedded hardware. With more powerful hardware it is also possible to use around 2000 vocabulary entries, whereby in this case combinations of one or more vowels with one or more consonants and other frequent syllables are added in.

The order of occurrence of these units of the recognition vocabulary (vocabulary elements) in a word is restricted either by a static bigram or trigram speech model, trained on the vocabulary, or by a grammar G which specifies the phonetic word-formation rules for the language concerned.

Such a grammar G, which can be specified with the form and capabilities of a Mealy automaton, specifies for example a word as a sequence of one or more syllables, and then each of these syllables in turn as a sequence of an optional initial sound, vowel and optional final sound. It specifies the consonants and consonant clusters of which the initial sounds and final sounds of the language under consideration can consist, and which groups of final sounds can follow which vowels.

In addition, the grammar also specifies any consonantal syllables, such as dl in the proper name Brandl. A typical grammar is shown in FIG. 2.

The first speech recognition system in the form of the phoneme recognizer A now returns as its result a sequence of such units from the vocabulary. For the word Mönchengladbach for example, this is the sequence m-ö-nch-en-gl-a-t-b-a-x or even—if the recognition is poor—b-öh-mch-nen-k-au-b-a-k.

It has proven to be especially advantageous if, for making the selection which follows later of the recognition vocabulary for the second speech recognition system in the form of the speech unit recognizer B, these sequences of phonemes and larger units which have been recognized are now split up again into phoneme sequences. For the example cited above, this produces the phoneme sequences m-ö-n-ch-e-n-g-l-a-t-b-a-x or b-öh-m-ch-n-e-n-k-au-b-a-k respectively, which are used for subsequent processing.

In the second stage of the method for speech recognition, vocabulary entries which are similar to the phoneme-containing sequence are selected from a selection vocabulary, using a fuzzy match. For this purpose, the fuzzy-match index system C is used to search in the database D for the 300 entries which are most similar in the fuzzy-match sense to the phoneme sequence which has been recognized.

To make this fuzzy search possible, an index is constructed in accordance with the following method. Each of the n entries in the database is given a unique index number from $\{1 \ldots n\}$. To give the phonetic representation of any particular entry i, including its start and end markers (#), the set of bigrams which it contains is formed. Accordingly, for Mönchengladbach and the phoneme sequence m-ö-n-ch-e-n-g-l-a-t-b-a-x the phoneme bigrams {#-m,m-ö,ö-n,n-ch,ch-e,e-n,n-g,g-l,l-a,a-t,t-b,b-a,a-x,x-#} are formed.

For each bigram b from this set, an index entry b-$\{i\}$ is stored. If bigram b occurs again in another entry j, the index entry is extended correspondingly to b $\{i,j\}$. This is continued for all the entries and all the bigrams.

The result is a sparsely populated matrix of bigrams (types) against the index numbers concerned for the entries in which the bigram occurs.

The fuzzy-match is now implemented in such a way that the phoneme sequence which is recognized, for example b-öh-m-ch-n-e-n-k-au-b-a-k, is split up into the set of its bigrams BM {#-b,b-öh,öh-m,m-ch,ch-n,n-e,e-n,n-k,k-au,au-b,b-a,a-k,k-#}.

For each bigram, its assigned vector of index numbers is read out of the memory and a fuzzy set VM is formed of the union of those index numbers to which reference is made by bigrams in BM. In doing this, each element e of this union set VM is given a frequency count specifying how many bigrams in BM refer to e.

In the example cited, for the entry i (Mönchengladbach) the frequency count is, for example, 2 because only e-n and b-a refer to i.

Finally, the calculated frequency h of the index number is converted to a weighted measure g, normalized by the length of the pattern, lm, and the length of the phonetic form of the entry, le. This is done in accordance with the formula $$g = -\log(h/lm)*0.5 + -\log(h/le)*0.5 \text{ or in accordance with some other suitable formula.}$$

The elements in the fuzzy union set VM are now sorted in order of increasing weight.

For the third stage, speech unit recognition by the speech unit recognizer, the first 300 elements, for example, of the entries assigned to the sorted set VM are loaded as a vocabulary into the second speech recognition system in the form of the speech unit recognizer B. Using the speech unit recognizer, which is implemented in particular as a word recognizer, the speech signal stored in the speech memory F is now analyzed once again. Typically, the speech recognition system should output the m best-recognized words.

The vocabulary size of 300 quoted for the first speech recognition system in the form of the phoneme recognizer A is an arbitrary size. It is in general the case that the more larger units the lexicon contains the better is the recognition result. If the computing power of the hardware allows, it can be advantageous for example to use a vocabulary which instead of the 300 entries quoted consists of the syllables of a language or all the syllables which occur in the database. In German, allowance should be made in this case for some 7000 entries. The formulation of the phonetic word grammar can be restricted to the trivial rule Word=Syllable* (a word consists of a sequence of one or more syllables).

The fuzzy-match system can possibly be improved if sounds which are known to be easily confused with each other, such as m and n, are standardized to a single sound, for example n, both in the database and also in the recognized phoneme sequence. In the above example the entry for Mönchengladbach would have been given two points more with an m-n standardization. However, initial empirical tests have until now shown that the use of such standardization also contributes strongly to the selection of incorrect entries.

Furthermore, it may be possible to improve the fuzzy-match system by structuring the frequency calculation in such a way that bigrams which contain sounds which are known to be hard to recognize, such as for example the voiceless plosives p, t, k, contribute only to a limited extent as 1,0 to the frequency of the corresponding index numbers.

The fuzzy-match system can be improved by including in the normalized weighted measure not only the frequency of the bigrams but also the absolute difference between the number of vowels ve in the database entry and in the search pattern vs, together with the absolute difference in the lengths of the database entry le and the search pattern lm. This can be done, for example, by calculating a weighted measure g according to the following formula:

$$g = -\log(h/lm)*f_1 + -\log(h/le)*f_2 + -\log(1/(abs(vm-ve)+1) + -\log(1/(abs(lm-le)+1))*f_4$$

where the values of the coefficients $f_n$ must be logically chosen.

The vocabulary size of 300 quoted for the second speech recognition system in the form of the speech unit recognizer B is also an arbitrary size. If the computing power of the hardware allows, it is certainly advantageous to use, instead of the 300 entries indicated, a larger dynamic vocabulary with a size of v. Correspondingly, the first v elements in the sorted set VM will be selected for further consideration by the fuzzy-matching.

The invention realizes the recognition of individual words from large vocabularies using limited hardware requirements by a subdivision into three simpler operations.

Speech recognition for vocabularies of up to 300 words on a PDA or on vehicle electronic equipment (a navigation system) is today already the state of the art and achievable.

The memory space and CPU requirements for the fuzzy-matching are demonstrably small. The following examples will serve to confirm this.

Memory requirement: with an estimated average word length roughly estimated as 10 phonemes/word, because the average word length in German is approximately 8, plus word start and end markers to give 10, a vocabulary of 65,000 words contains 650,000 phoneme instances (tokens). This value is also confirmed by 65,000 town names. Since the number of bigram instances is trivially equal to the number of phoneme instances, this implies a set of approx. 650,000 bigram instances. The number of different bigram types is of course less. Measurements on empirical data give a set of approx. 1,200 bigram types. Trivially, the number of entries in the sparsely populated index matrix is equal to the number of bigram instances, that is approx. 650,000. The coding of 65,000 (>64 k) index numbers required 3 bytes per index number, so that the storage requirement for the sparsely populated index matrix is 1,950,000 bytes, or approx. 2 MB. In addition, there is the storage requirement for the graphemic representation of the entries (approx. 700 KB) plus one byte each for the storage of the length of the phoneme chain and the number of vowels (together 130,000 bytes) together with a working memory for the formation of the fuzzy union set of at most 65,000 elements. The memory requirement of each element is around 7 bytes: 3 bytes for the index number and 4 bytes for the real-number representation of the weight. 455,000 bytes should thus be reserved for the working memory. For a vocabulary of 65,000 entries, the total storage requirement for the fuzzy matching is thus a maximum of 3.2 MB.

CPU requirement: the CPU requirement depends on the formation of the fuzzy union set. With 650,000 bigram instances and 1200 different bigram types, there is an average of approx. 540 index numbers per bigram. The number of additions required for calculating the frequencies thus amounts on average to n*540 for a chain of recognized phonemes with a length of n. On top of this there is the calculation of the weight and the corresponding sorting of the working memory.

The invention also comprises a program product which, when it is loaded onto a data processing system and is executed on it, sets in operation a device for performing the following method steps for speech recognition:
assigning a phoneme-containing sequence to a speech unit by a phoneme recognizer;
selecting vocabulary entries similar to the phoneme-containing sequence from a selection vocabulary;
recognizing the speech unit by a speech unit recognizer, wherein a recognition vocabulary of the speech unit recognizer contains the selected vocabulary entries which are similar to the phoneme-containing sequence, wherein, for the purpose of selecting the vocabulary entries which are similar to the phoneme-containing sequence, the phoneme-containing sequence is split up into phoneme units;
determining the frequency of occurrence of each phoneme unit in the corresponding vocabulary entry;
forming a set which is the union of all such vocabulary entries having at least one phoneme unit in common with the speech unit, and of a corresponding frequency measure representing how often the phoneme units of the speech unit occur in the corresponding vocabulary entry; and
normalizing the frequency measure relative to a length of the speech unit and to a length of the corresponding vocabulary entry, wherein
the recognition vocabulary is selected from the union set on the basis of the normalized frequency measure.

The invention claimed is:
1. A method for speech recognition, comprising:
assigning a phoneme-containing sequence to a speech unit by a phoneme recognizer;

selecting vocabulary entries similar to the phoneme-containing sequence from a selection vocabulary;

recognizing the speech unit by a speech unit recognizer, wherein a recognition vocabulary of the speech unit recognizer contains the selected vocabulary entries which are similar to the phoneme-containing sequence, wherein, for the purpose of selecting the vocabulary entries which are similar to the phoneme-containing sequence, the phoneme-containing sequence is split up into phoneme units;

determining the frequency of occurrence of each phoneme unit in the corresponding vocabulary entry;

forming a set which is the union of all such vocabulary entries having at least one phoneme unit in common with the speech unit, and of a corresponding frequency measure representing how often the phoneme units of the speech unit occur in the corresponding vocabulary entry; and normalizing the frequency measure relative to a length of the speech unit and to a length of the corresponding vocabulary entry, wherein the recognition vocabulary is selected from the union set on the basis of the normalized frequency measure.

2. The method in accordance with claim 1, wherein for the recognition vocabulary of the phoneme recognizer, not only phonemes but also larger units are used and are assigned to the speech unit as phonemes.

3. The method in accordance with claim 2, the larger units are consonant clusters, combinations of a vowel and a consonant, and/or the most commonly occurring syllables.

4. The method in accordance with claim 2, wherein the number of vocabulary entries for the phoneme recognizer amounts to less than 10% of the vocabulary entries of the selection vocabulary.

5. The method in accordance with claim 2, wherein the order of their occurrence in the sequence of phonemes is restricted by a speech model and/or a speech unit grammar which specifies the phonetic rules of speech unit formation.

6. The method in accordance with claim 2, wherein the larger units are split up into phonemes before the selection is made of the vocabulary entries which are similar to the phoneme-containing sequence.

7. The method in accordance with claim 2, wherein the selection of the vocabulary entries similar to the phoneme-containing sequence is made with the aid of an index search.

8. The method in accordance with claim 1, wherein the number of vocabulary entries for the phoneme recognizer amounts to less than 10% of the vocabulary entries of the selection vocabulary.

9. The method in accordance with claim 8, wherein the number of vocabulary entries for the phoneme recognizer amounts to less than 1%.

10. The method in accordance with claim 8, wherein the order of their occurrence in the sequence of phonemes is restricted by a speech model and/or a speech unit grammar which specifies the phonetic rules of speech unit formation.

11. The method in accordance with claim 1, wherein the order of their occurrence in the sequence of phonemes is restricted by a speech model and/or a speech unit grammar which specifies the phonetic rules of speech unit formation.

12. The method in accordance with claim 1, wherein the selection of the vocabulary entries similar to the phoneme-containing sequence is made with the aid of an index search.

13. The method in accordance with claim 1, wherein for the purpose of selecting the vocabulary entries which are similar to the phoneme-containing sequence, phoneme bigrams are formed corresponding to the phoneme-containing sequence.

14. The method in accordance with claim 1, wherein the number of selected vocabulary entries which are similar to the phoneme-containing sequence amounts to less than 10% of the vocabulary entries in the selection vocabulary.

15. The method in accordance with claim 14, wherein the number of selected vocabulary entries which are similar to the phoneme-containing sequence amounts to less than 1%.

16. The method in accordance with claim 1, wherein the speech unit recognizer has an HMM recognizer.

17. The method in accordance with claim 1, wherein the speech unit is a word.

18. A device for speech recognition which is equipped and has facilities for carrying out the method of claim 1.

19. A program product which, when it is loaded onto a data processing system and is executed on it, sets in operation the method of claim 1.

* * * * *